(12) United States Patent
Sorensen et al.

(10) Patent No.: US 6,284,019 B1
(45) Date of Patent: Sep. 4, 2001

(54) SCRUBBER AND METHOD FOR REMOVING POLLUTANTS FROM A GAS WITH INTERMEDIATE SUMP FOR COLLECTING FILTERING AGENT

(76) Inventors: Ian W. Sorensen, 5337 N. Questa Tierra Dr., Phoenix, AZ (US) 85012; Edward A. Lamb, 23622 S. Cloverland Ct., Chandler, AZ (US) 85248

( * ) Notice: Subject to any disclaimer, the term of this patent is extended or adjusted under 35 U.S.C. 154(b) by 0 days.

(21) Appl. No.: 09/559,301

(22) Filed: Apr. 25, 2000

Related U.S. Application Data (62) Division of application No. 08/946,134, filed on Oct. 7, 1997, now Pat. No. 6,068,686.

(51) Int. Cl.[7] .................................................. B01F 3/04
(52) U.S. Cl. .......................... 95/13; 95/149; 95/217; 96/244; 96/265; 261/111; 261/118
(58) Field of Search ..................... 95/8, 13, 149, 95/216, 217; 96/244, 265, 296, 297; 261/111, 118

(56) References Cited

U.S. PATENT DOCUMENTS

| | | | |
|---|---|---|---|
| 2,539,344 | * | 1/1951 | Carraway .............................. 261/118 |
| 2,639,947 | * | 5/1953 | Tramm et al. ....................... 261/111 |
| 5,667,651 | * | 9/1997 | Bryan .................................... 204/401 |
| 5,876,662 | * | 3/1999 | Jain ........................................ 422/12 |

FOREIGN PATENT DOCUMENTS 51-23478  *  2/1976  (JP) .......................................... 95/13

* cited by examiner

Primary Examiner—David A. Simmons
Assistant Examiner—Robert A. Hopkins
(74) Attorney, Agent, or Firm—Parsons & Goltry; Robert A. Parsons; Michael W. Goltry (57) ABSTRACT

A scrubber for removing pollutants from a gas comprising a housing for conducting the gas therethrough, a mechanism for introducing pollutant-reactive filtering agent into the housing, a sump for collecting the filtering agent and having a first volume, and an intermediate sump for collecting the filtering agent and channeling the filtering agent into the sump, the intermediate sump having a second volume that is less than the first volume.

12 Claims, 9 Drawing Sheets

SCRUBBER AND METHOD FOR REMOVING POLLUTANTS FROM A GAS WITH INTERMEDIATE SUMP FOR COLLECTING FILTERING AGENT

This application is a division of application Ser. No. 08/946,134, filed Oct. 7, 1997, now U.S. Pat. No. 6,068,686.

BACKGROUND OF THE INVENTION

1. Field of the Invention

This invention relates generally to the field of pollution control systems.

More particularly, this invention relates to apparatus for removing contaminants from fluid.

In a further and more specific aspect, the present invention relates to a system and method for removing pollutants from a fluid.

2. Prior Art

Industrialized processes normally produce undesirably large measures or quantities of contaminants or pollutant material that can be toxic to the environment and highly odoriferous. Normally, the pollutants are carried within fluid that may be in the form of a liquid or a gas. In this regard, to control the odoriferous and toxic pollutants, various apparatus and systems have been devised to filter or otherwise remove pollutants from fluid.

Of particular concern are waste treatment facilities located near municipalities. Although necessary for the proper treatment of municipal wastewater and other potential waste material, waste treatment facilities produce large amounts of toxic and highly odoriferous gaseous emanations. In this regard, odor scrubbers have been devised to remove undesirable toxic and odoriferous pollutants from the gaseous emanations produced from waste treatment facilities for substantially eliminating foul smells, reducing worker exposure to hazardous compounds and reducing corrosion to the facility equipment.

The largest odor component released by waste treatment facilities is hydrogen sulfide. Other odorous compounds that may be generated when treating waste material include mercaptans, dimethyl sulfide, dimethyl di-sulfide and other uncharacterized organic sulfide based constituents. In addition to the foregoing toxic and odoriferous constituents, toxic volatile organic compounds (VOCs) may also be produced. Nevertheless, the foregoing odorous and non-odorous compounds are treated using some form of removal technique. In this regard, most waste treatment plants are forced to deal with these compounds in addition to a variety of other air-borne contaminants that can be detrimental to the operation of odor removal systems. The current trend is to minimize releases into the atmosphere that may cause odor complaints from residential communities surrounding the waste treatment plant. Local air quality boards are also generating more stringent air quality guidelines due to increased federal requirements.

Current odor removal systems are expensive, difficult to construct and difficult to maintain. Although considerable effort has been invested toward the improvement of scrubber systems, existing scrubber system technology requires large amounts of energy, water, chemical reagents and maintenance in order to ensure proper operation. Therefore, the foregoing and other deficiencies replete throughout the art necessitate certain new and useful improvements.

It would be highly advantageous, therefore, to remedy the foregoing and other deficiencies inherent in the prior art.

Accordingly, it is an object of the present invention to provide a new and useful scrubber system and method for removing toxic and/or odoriferous pollutants from a fluid.

Another object of the present invention is to provide a scrubber system that is easy and relatively inexpensive to construct.

And another object of the present invention is to provide a scrubber system that utilizes a simple and efficient multi-stage scrubbing system.

Still another object of the present invention is to provide a scrubber system that is highly efficient.

Yet another object of the instant invention is to provide a scrubber system that is easy and inexpensive to maintain.

Yet still another object of the instant invention is to provide a scrubber system that conserves chemical reagents.

And a further object of the invention is to provide a scrubber system that is safe for workers and for municipalities.

Still a further object of the immediate invention is to provide a scrubber system that is dependable and requires little monitoring.

Yet a further object of the invention is to provide a scrubber system that conserves utilities and natural resources.

And still a further object of the invention is to provide a scrubber system that occasions no adverse environmental impacts as a result of operation.

Another object of the present invention is to provide a method of cleaning a sensor for monitoring a polluted fluid.

And another object of the present invention is to provide a method of monitoring a sensor for monitoring a polluted fluid.

SUMMARY OF THE INVENTION

Briefly, to achieve the desired objects of the instant invention in accordance with a preferred embodiment thereof, provided is a scrubber for removing pollutants from a fluid and having an inlet for receiving the fluid and an outlet for emitting the fluid. The scrubber is generally comprised of a primary scrubber assembly coupled with the fluid intermediate the inlet and the outlet for removing a primary measure of pollutants from the fluid, and a secondary scrubber assembly coupled with the primary scrubber assembly intermediate the inlet and the outlet, the secondary scrubber assembly for removing a secondary measure of pollutants from the fluid.

The primary scrubber assembly may be comprised of a first stage scrubber coupled with the fluid intermediate the inlet and the outlet for removing a first measure of pollutants from the fluid, and a second stage scrubber coupled with the first stage scrubber intermediate the inlet and the outlet, the second stage scrubber for removing a second measure of pollutants from the fluid. In a particular embodiment, the first stage scrubber may include a housing, a source of a filtering agent coupled with the housing in fluid communication, and means for communicating the filtering agent into the housing, the filtering agent reactive with the pollutants to remove the first measure of pollutants from the fluid. The means for communicating the filtering agent into the housing of the first stage scrubber may include a pump mounted with the source of a filtering agent and the housing in fluid communication, and at least one dispersing element mounted for communicating the filtering agent from the pump into the housing. The present invention may further include a control assembly for monitoring the measure of pollutants present within the fluid adjacent the inlet and for actuating the pump to either increase or decrease the amount of filtering agent supplied to the housing in response to the measure of pollutants.

Regarding a preferred embodiment, the second stage scrubber may include a housing, a source of a filtering agent coupled with the housing in fluid communication and means for communicating the filtering agent into the housing, the filtering agent reactive with the pollutants to remove the second measure of pollutants from the fluid. Regarding the second stage scrubber, the means for communicating the filtering agent into the housing may include a pump mounted with the source of a filtering agent and the housing in fluid communication, and at least one dispersing element mounted for communicating the filtering agent from the pump into the housing. Further regarding the second stage scrubber, the present invention may also provide a control assembly for monitoring the measure of pollutants present within the fluid intermediate the second stage scrubber and the secondary scrubber assembly and for actuating the pump to either increase or decrease the amount of filtering agent supplied to the housing in response to the measure of pollutants.

The secondary scrubber assembly of the present invention may be comprised of a housing and a plurality of filtering layers carried by the housing, the plurality of filtering layers cooperating together to remove the secondary measure of pollutants from the fluid. The plurality of filtering layers are preferably mounted with the housing in substantially vertical series and are each comprised of a plurality of trays removably carried by the housing, and filtering media removably carried by each of the plurality of trays.

Consistent with the foregoing scrubber system, a method of removing pollutants from a fluid may also be provided.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings in which.

DETAILED DESCRIPTION OF THE PREFERRED EMBODIMENT

Figure 1:
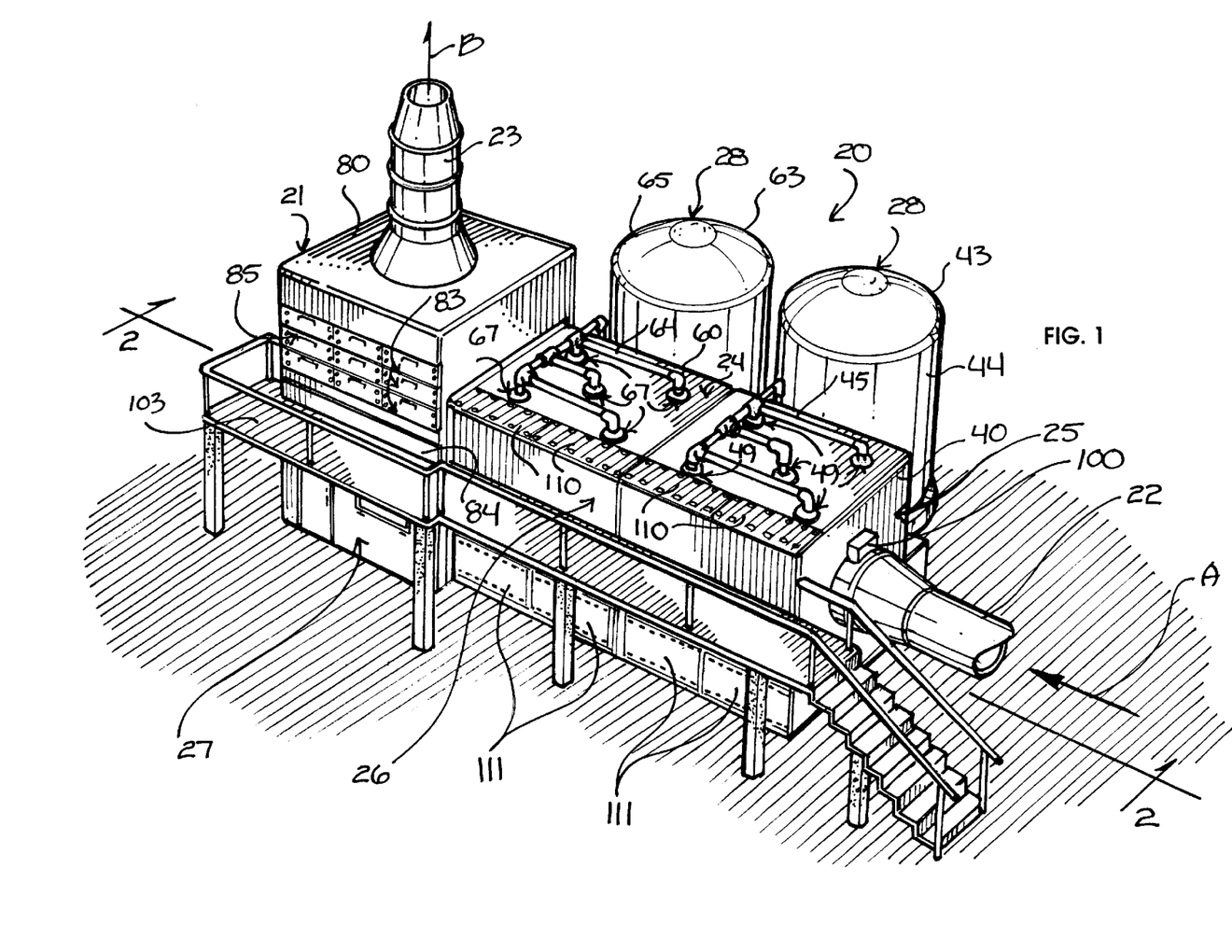
FIG. 1 illustrates a perspective view of a scrubber system for removing pollutants from a fluid including a wet stage scrubber assembly and a dry stage scrubber assembly, in accordance with a preferred embodiment of the present invention.

Turning now to the drawings, in which like reference characters indicate corresponding elements throughout the several views, attention is first directed to FIG. 1 which illustrates a perspective view of a scrubber system generally designated by the reference character 20. Scrubber system 20 is of a type for removing pollutants from a fluid such as a gas and perhaps a liquid. In a preferred application, scrubber system 20 is more particularly of a type that may be used at municipal wastewater treatment facilities and various industrial facilities for removing pollutants from the gases produced from the treatment of the wastewater and from industrial processes. However, scrubber system 20 may be employed in other similar applications if desired. For the purposes of the ensuing discussion, pollutants will be hereinafter collectively referred to as pollutants.

In general, scrubber system 20 is generally comprised of a structure 21 having an inlet 22 for receiving contaminated gas or gas having pollutants in the direction indicated by the arrowed line A. Also included is an outlet 23 for emitting clean gas or gas substantially free from pollutants in the direction indicated by the arrowed line B. From inlet 22, gas initially enters into a primary or wet stage scrubber assembly 24 in which a primary measure of pollutants are removed from the fluid. In the present embodiment, wet stage scrubber assembly 24 is comprised of a first stage scrubber 25 and a second stage scrubber 26 coupled in series intermediate inlet 22 and outlet 23. In this regard, gas entering inlet 22 passes consecutively through first stage scrubber 25 and second stage scrubber 26 and is wetted or otherwise treated with one or more liquid chemical reagents supplied from a liquid delivery system 28, further details to be discussed as the detailed description ensues. The gas will then pass from the wet stage scrubber assembly 24 into a secondary, third stage or dry stage scrubber assembly 27 where the gas will conduct through a dry filtering media to remove a secondary measure of pollutants from the fluid which will thereafter conduct or emit outwardly through outlet 23.

It will be generally understood that scrubber system 20 utilizes a multi-stage scrubber assembly comprised of first and second wet stage scrubbers 25 and 26 and a dry third stage scrubber 27. In this regard, scrubber system 20 may include less than or more than two wet stage scrubbers and perhaps more than one dry stage scrubber as desired in order to effectuate the desired removal of pollutants consistent with the teachings herein. Accordingly, the first and second wet stage scrubbers 25 and 26 and the dry third stage scrubber 27 of scrubber system 20 are set forth merely for the purposes of example in light of a preferred embodiment and are not intended to be limiting features.

Consistent with the foregoing and ensuing discussions, it will be generally understood that for gas to pass from inlet 22 to outlet 23, the gas must be flowing. In this regard, the flowing movement of the gas may be accomplished from a location remote from scrubber system 20 or may be accomplished by a motorized or otherwise mechanical mechanism carried by scrubber system 20. Furthermore, gas entering inlet 22 is generally considered to be contaminated with a measure of pollutants. The measure of pollutants may be considered to be an amount or level of pollutants or perhaps one or more specific types of pollutants.

Figure 2:
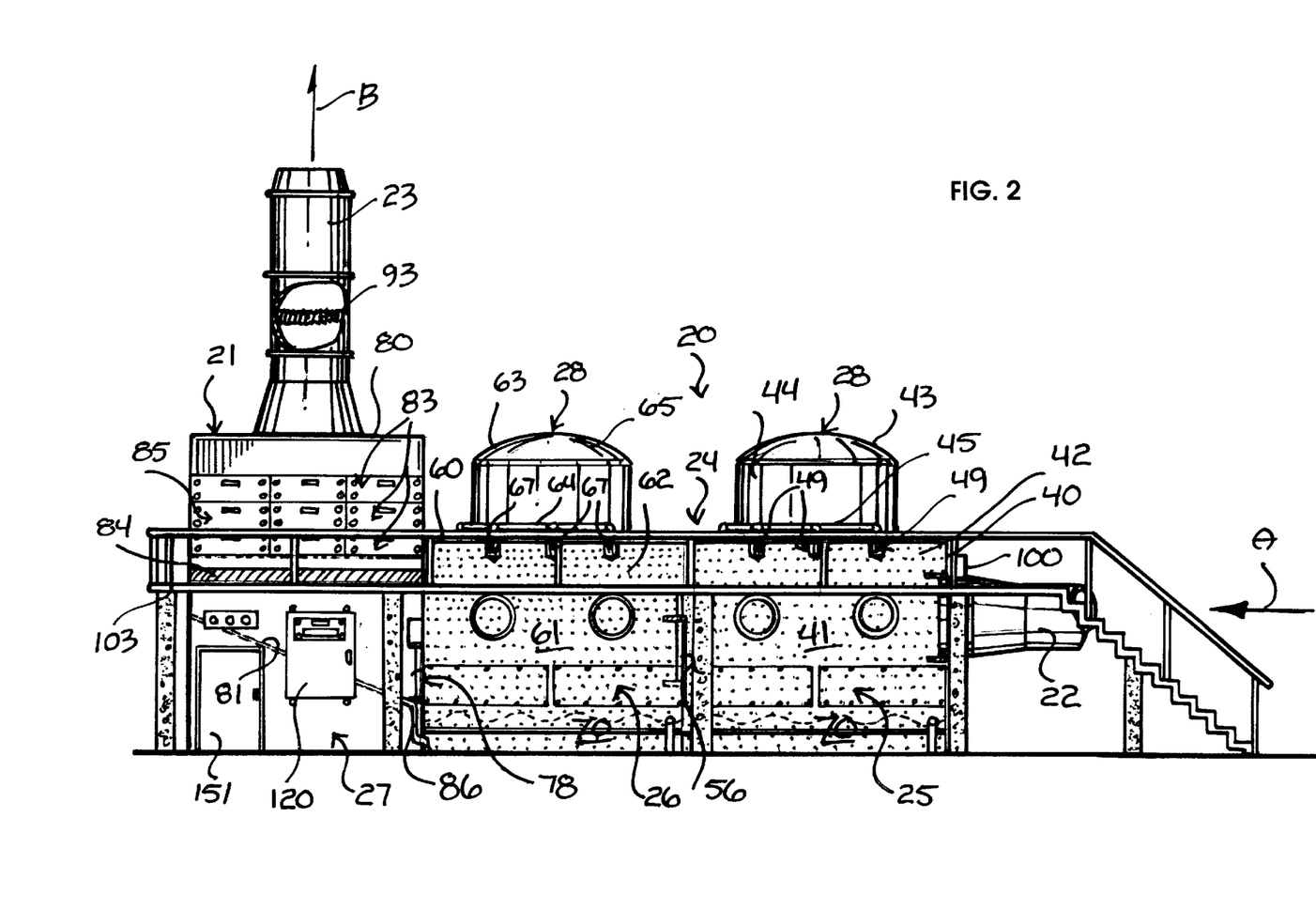
FIG. 2 illustrates a sectional view taken along line 2—2 of FIG. 1, in accordance with a preferred embodiment of the present invention.

Having described the general structural and functional characteristics of scrubber system 20, attention is now directed to FIG. 2 illustrating a sectional view taken along line 2—2 of. FIG. 1. As evidenced in FIG. 2, contaminated gas enters inlet 22 in the direction indicated by the arrowed line A and enters into first stage scrubber 25. First stage scrubber 25 is generally comprised of a housing 40 that, as best seen in FIG. 1, is generally cubical in shape, although this is not essential. Housing 40 bounds or otherwise defines a chamber 41 within which is carried a media 42. In the specific example shown in FIG. 2, media 42 extends throughout substantially the entire extent of chamber 41, although this is not an essential feature. Consistent with conventional practice, media 42 is preferably comprised of a low-density material to allow gas to easily pass therethrough and may be comprised of low density polypropylene, a cellular or foam packing material or other suitable low density/high surface area packing media.

As previously indicated, gas passing into and through chamber 41 of first stage scrubber 25 is wetted or otherwise treated with a liquid chemical reagent supplied from a first liquid delivery assembly 43 of liquid delivery system 28. With momentary reference to FIG. 3, first liquid delivery assembly 43 of liquid delivery system 28 is generally comprised of a receptacle 44 coupled with chamber 41 of first stage scrubber 25 in fluid communication by virtue of a conduit assembly 45. Consistent with conventional practice, receptacle 44 carries, and is operative as a source of, a liquid chemical reagent. The chemical reagent is operative as a filtering agent and is drawn out of receptacle 44 and into and through conduit assembly 45 by virtue of a conventional pump 48 coupled with conduit assembly 45, receptacle 44 and housing 40 of first stage scrubber 25 in fluid or otherwise liquid chemical reagent communication. To communicate the liquid chemical reagent from conduit assembly 45 into chamber 41 (not shown in FIG. 6) of housing 40, conduit assembly 45 branches out from pump 48 and terminates at a plurality of locations with a corresponding plurality of nozzle assemblies 49 mounted with housing 40 at a generally elevated location, also shown in FIG. 2. In this regard, and consistent with normal operation, each nozzle assembly 49 facilitates the communication and dispersion of the liquid chemical reagent into chamber 41 of housing 40. Upon introduction of the liquid chemical reagent within chamber 41, it will descend through media 42 and engage, wet or otherwise treat the contaminated gas flowing therethrough, further details to be presently discussed.

Figures 4, 5:
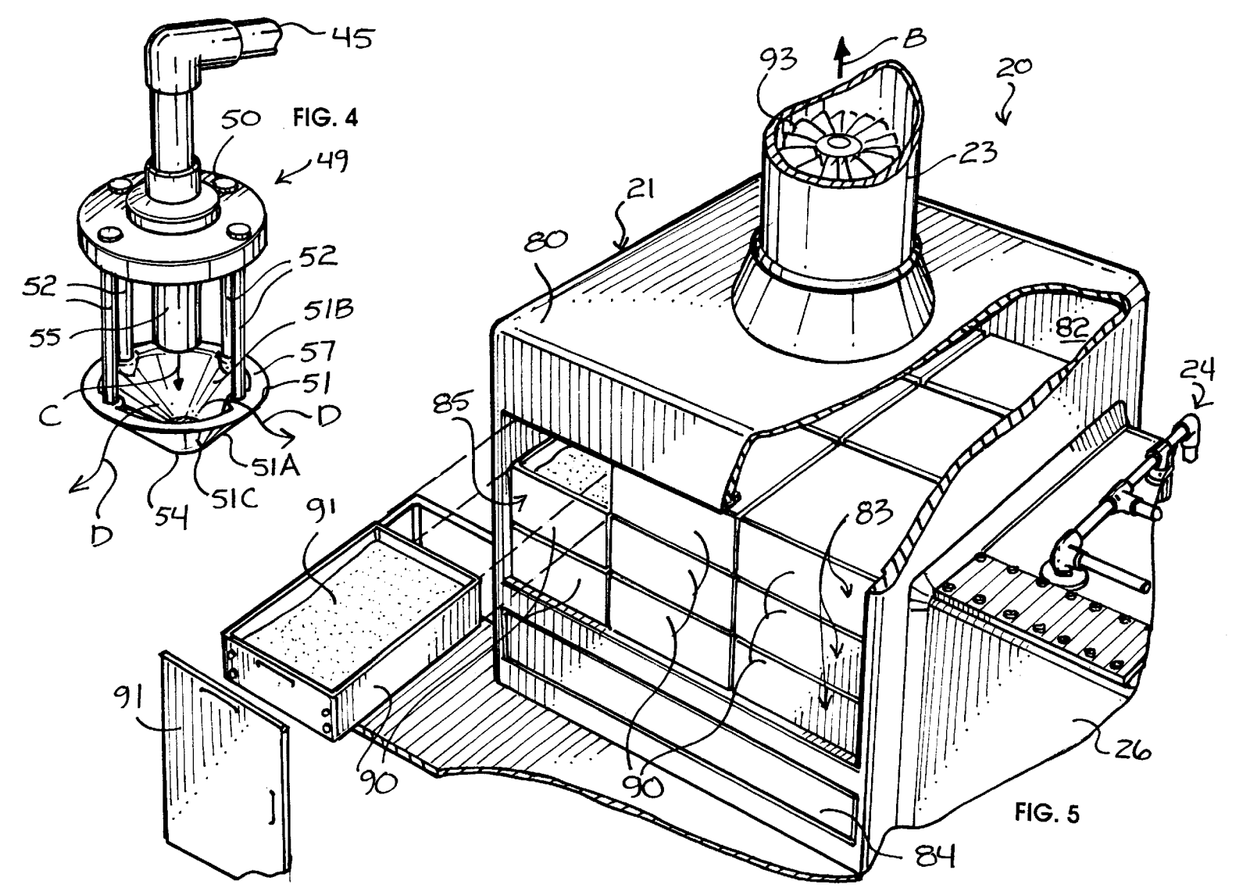
FIG. 4 illustrates a nozzle assembly operative for communicating liquid from the liquid delivery system of FIG. 3 to the wet stage scrubber assembly of FIG. 1, in accordance with a preferred embodiment of the present invention.
FIG. 5 illustrates a fragmented partially exploded perspective view of the dry stage scrubber assembly of FIG. 1, in accordance with a preferred embodiment of the present invention.
Figure 6:
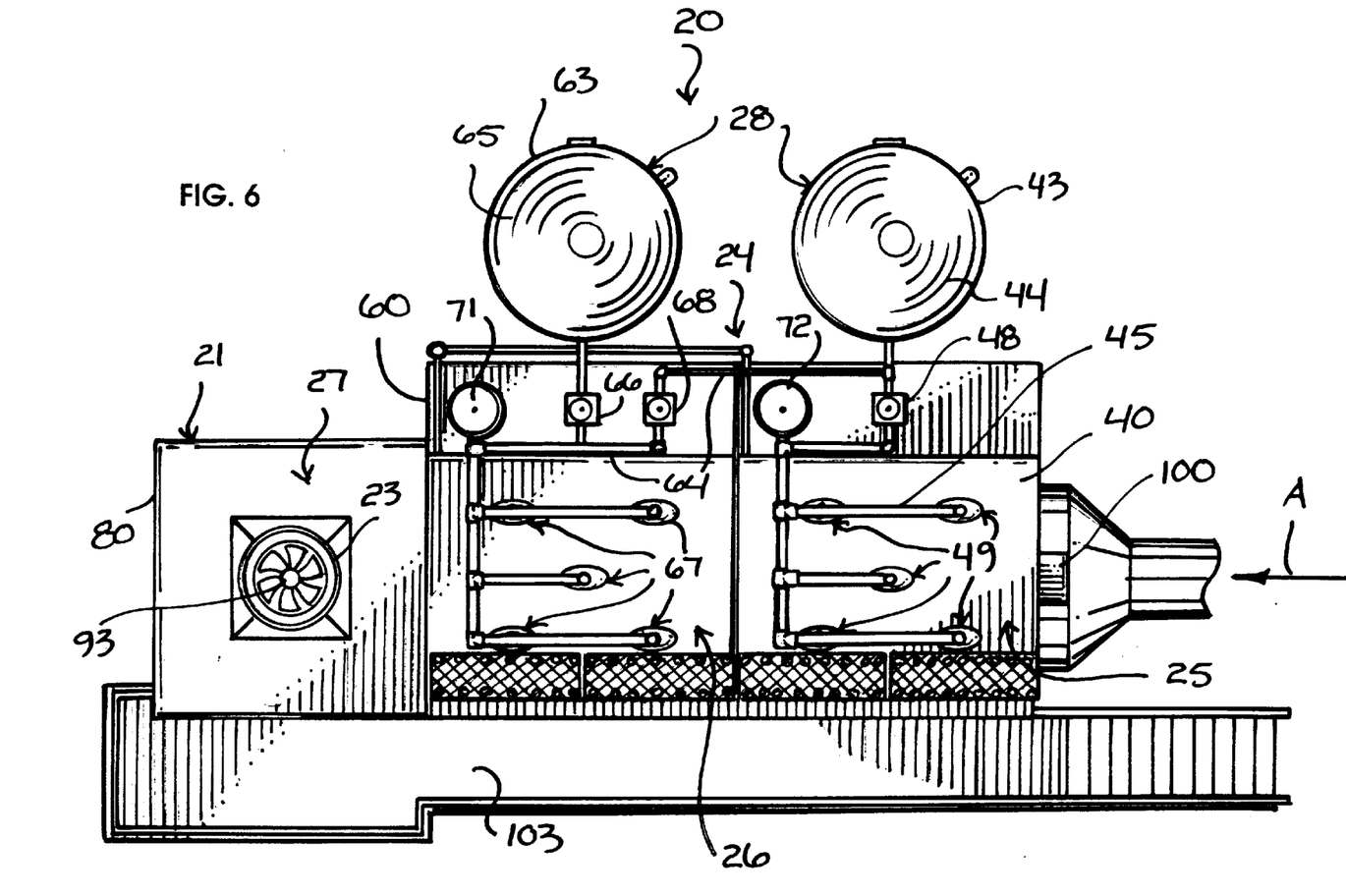
FIG. 6 illustrates a top plan view of the scrubber system of FIG. 1, in accordance with a preferred embodiment of the present invention.
Figure 7:
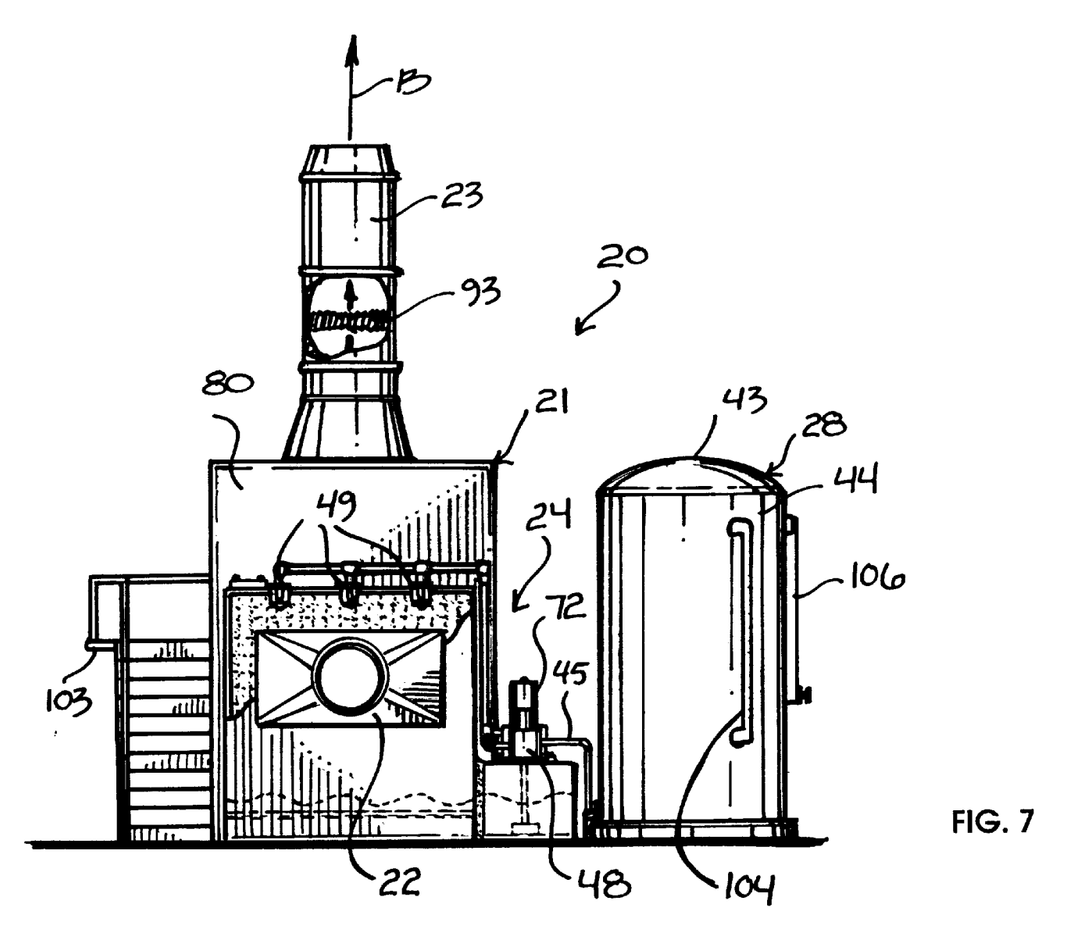
FIG. 7 illustrates an end elevational view of the scrubber system of FIG. 1, in accordance with a preferred embodiment of the present invention.

With momentary attention to FIG. 4, illustrated is a perspective view of one of the plurality nozzle assemblies 49 first discussed in combination with FIG. 6. As evidenced in FIG. 4, each nozzle assembly 49 includes a base plate 50 engagable with housing 40 by virtue of rivets, bolts, screws or other conventional fastening mechanism. Also included is an inverted substantially conical member 51 mounted with base plate 50 in spaced relation by virtue of a plurality of rods 52. Conical member 51 includes a substantially conical sidewall 51A having a substantially conical first major surface 51B, a substantially conical second major surface 51C, a continuous upper edge 57 and a nadir 54. At each of the terminating points of conduit assembly 45 previously introduced, conduit assembly 45 extends through base plate 50 and terminates with an open end 55 -extending inwardly into chamber 41 through housing 40 at a location spaced from conical member 51. In this regard, base plate 50 and rods 52 merely operate as a means of suspending conical member 51 within chamber 41 in spaced relation from open end 55. Therefore, and consistent with the nature and scope of the present invention, other mechanical structures may be used for suspending conical member 51 within housing 41 in spaced relation relative open end 55 if desired.

In the foregoing manner of construction of nozzle assembly 49, liquid chemical reagent passing through conduit assembly 45 will pass through and emerge through each respective open end 55 in the direction indicated by the arrowed line C in FIG. 4 and impact substantially conical first major surface 51B of conical member 51. Upon impaction with substantially conical first major surface 51B, the liquid chemical reagent will deflect therefrom and spatter and disperse outwardly from edge 57 in the directions generally indicated by the arrowed lines D. The simple and efficient design of conical member 51 and its orientation relative open end 55 contributes to the ability of conical member 51 to act as a highly efficient dispersing element for dispersing liquid chemical reagent into housing 41 without the risk of becoming clogged or otherwise blocked with extraneous contamination buildup which is otherwise common with convention and well known nozzle assemblies currently in use in combination with scrubber systems of the type herein described.

As previously mentioned, base plate 50 of each nozzle assembly 49 may be mounted with housing 40 by virtue of rivets, bolts, screws or other conventional fastening mechanism. Nevertheless, base plate 50 is preferably detachably mounted with housing 40 by virtue of either bolts, screws or other suitable engagement mechanism operative for facilitating the detachable engagement of base plate 50 with housing. The preferred detachable engagement of base plate 50 with housing allows users to easy access, remove, replace and/or repair each nozzle assembly 49 from an exterior location.

Consistent with conventional practice, the liquid chemical reagent that may be used to wet or otherwise treat the contaminated gas passing through chamber 41 of first stage scrubber desirably operates to react with the pollutants to either dissolve them or form precipitates to pull or otherwise remove the pollutants from the gas. Because odoriferous contaminates are primarily comprised of hydrogen sulfide and other sulfide-based compounds or constituents, the liquid chemical reagent may be comprised of sodium hydroxide or other similar and suitable caustic substance having a relatively high pH level on the order of 10–11. When introduced into chamber 41, the sodium hydroxide or other similar substance will react with the hydrogen sulfide and other sulfide-based compounds to form precipitates which fall out of the contaminated gas. Thus, first stage scrubber 25 operates to desirably remove a first measure of pollutants from the total measure of pollutants carried by the contaminated gas. The first measure of pollutants removed by first stage scrubber 25 may be either one or more specific types of pollutants or perhaps an amount or quantity of the total measure of the pollutants carried by the contaminated gas.

With attention directed back to FIG. 2, from first stage scrubber 25, the contaminated gas will pass through a passageway or opening 56 and enter second stage scrubber 26. Although not an essentially limiting feature, opening 56 may be obstructed by a low density screen or filter and is preferably located somewhat subjacent inlet 22 to facilitate the efficient flow of the contaminated gas from first stage scrubber 25 to second stage scrubber 26. Like first stage scrubber 25, second stage scrubber 26 is generally comprised of a housing 60 that, as best seen in FIG. 1, is generally cubical in shape, although this is not essential. Housing 60 bounds or otherwise defines a chamber 61 within which is carried a media 62. In the specific example shown in FIG. 2, media 62 extends throughout substantially the entire extent of chamber 61, although this is not an essential feature. Consistent with conventional practice, and like media 42, media 62 is preferably comprised of a low-density material to allow gas to easily pass therethrough and may be comprised of low density polypropylene, a cellular or foam packing material or other suitable low density/high surface area packing media.

Figure 3:
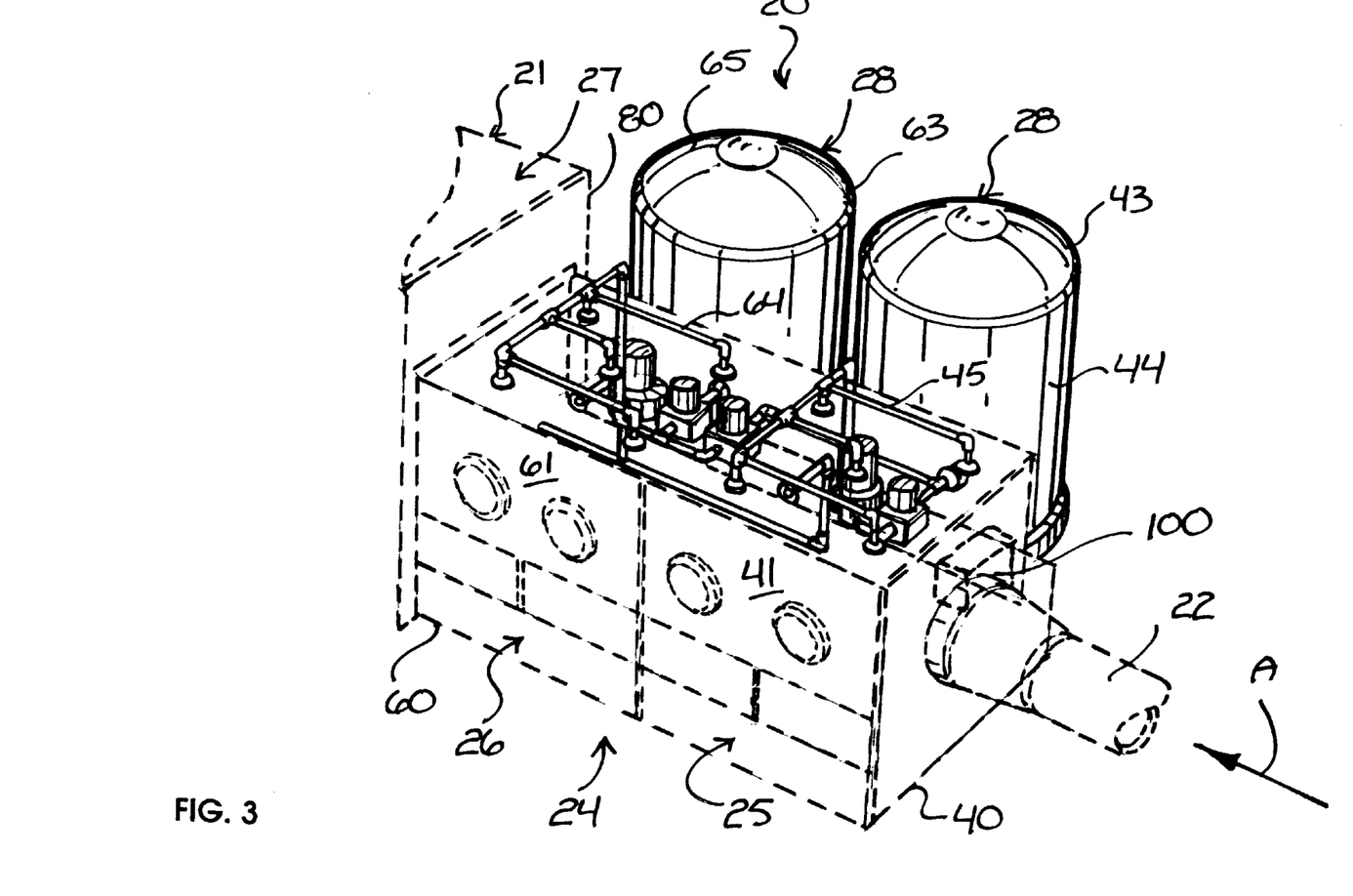
FIG. 3 illustrates a perspective view of a liquid delivery system for supplying liquid to the wet stage scrubber assembly of the scrubber system of FIG. 1, in accordance with a preferred embodiment of the present invention.

As previously indicated, gas passing into and through chamber 61 of second stage scrubber 26 is wetted or otherwise treated with a liquid chemical reagent supplied from first liquid delivery assembly 43 and a second liquid delivery assembly 63 of liquid delivery system 28. With momentary reference to FIG. 6, receptacle 44 of first liquid delivery assembly 43 is coupled with chamber 61 of second stage scrubber 26 in fluid communication by virtue of a conduit assembly 64. In this regard, receptacle 44 is generally intended to be included within the scope of second liquid delivery system 63. Furthermore, and as also shown in FIG. 3, second liquid delivery assembly 63 of liquid delivery system 28 is further comprised of a receptacle 65 coupled with chamber 61 of second stage scrubber 26 in fluid communication by virtue of conduit assembly 64. Consistent with conventional practice, receptacle 65 carries, and is operative as a source of, a liquid chemical reagent which may be different from the liquid chemical reagent carried by receptacle 44. The chemical reagent carried by receptacle 65 is operative as a filtering agent and is drawn out of receptacle 65 and into and through conduit assembly 64 by virtue of a conventional pump 66 coupled with conduit assembly 64, receptacle 65 and housing 60 of second stage scrubber 26 in fluid or otherwise liquid chemical reagent communication. To communicate the liquid chemical reagent from conduit assembly 64 into chamber 61 (not shown in FIG. 6) of housing 60, conduit assembly 64 branches out from pump 66 and terminates at a plurality of locations with a corresponding plurality of nozzle assemblies 67 mounted with housing 60 and extending into chamber 61 at a generally elevated location (also shown in FIG. 2). In this regard, and consistent with normal operation, each nozzle assembly 67 facilitates the communication and dispersion of the liquid chemical reagent into chamber 61 of housing 60. Upon introduction of the liquid chemical reagent within chamber 61, it will descend through media 62 and engage, wet or otherwise treat the contaminated gas flowing therethrough. Each nozzle assembly 67 is substantially identical to nozzle assembly 49 discussed in combination with first stage scrubber 25, further details of which will not be further discussed. The chemical reagent carried by receptacle 44 of first liquid delivery system 43 may be drawn therefrom into and through conduit assembly 64 by virtue of a conventional pump 68 coupled with conduit assembly 64 intermediate receptacle 44 and housing 60 of second stage scrubber 26 in fluid or otherwise liquid chemical reagent communication.

The purpose of wetting or otherwise treating the contaminated gas passing through chamber 61 of second stage scrubber is to enhance the effectiveness of the removal of the pollutants from the contaminated gas. In this regard, in addition to the sodium hydroxide supplied from receptacle 44 of the first liquid delivery assembly 43, receptacle 65 preferably carries sodium hypochlorite which is also added to chamber 61 to wet or otherwise treat the contaminated gas passing through chamber 61 of second stage scrubber 26. Treating the contaminated gas with a selected combination of sodium hydroxide and sodium hypochlorite operates to not only dissolve or precipitate hydrogen sulfide and other sulfide-based compounds from the contaminated gas, but also operates to enhance the dissolution or precipitation of sulfide-based compounds other than hydrogen sulfide in order to remove a second measure of pollutants from the contaminated gas. In this manner, when introduced into chamber 61, the sodium hydroxide and the sodium hypochlorite will react with the hydrogen sulfide and other sulfide-based compounds to dissolve the compounds or form precipitates which fall out of the contaminated gas. Thus, second stage scrubber 26 operates to desirably remove a second measure of pollutants from the total measure of pollutants carried by the contaminated gas. Like the first measure of pollutants removed by first stage scrubber 25, the second measure of pollutants removed by second stage scrubber 26 may be either one or more specific types of pollutants or perhaps an amount of the total measure of the pollutants carried by the contaminated gas.

Although sodium hydroxide and sodium hypochlorite have been disclosed as preferred liquid chemical reagents, those of ordinary skill will readily appreciate that other chemical reagents may be used if desired depending on the type of pollutants carried by the contaminated gas. Furthermore, although the sodium hydroxide and the sodium hypochlorite are each channeled into and through conduit assembly 64 for communicating each into chamber 61 of second stage scrubber 26, those having regard toward the relevant art will readily appreciate that the direct mixing of sodium hydroxide with sodium hypochlorite would result in a violent chemical reaction that may not only occasion damage to scrubber system 20 but also prove hazardous to workers. As a consequence, and although not herein specifically shown, conduit assembly 64 is configured in a manner such that the sodium hydroxide and the sodium hypochlorite are mixed together in the presence of water to thereby eliminate the potential of a violent chemical reaction. This aspect of the present disclosure is well known by those having regard toward the relevant art and is a feature common to prior art scrubbers of the type herein disclosed, further details of which will not be herein further discussed as they will readily occur to the skilled artisan.

Regarding FIG. 2, the pollutants removed from the contaminated gas by first stage scrubber 25 and second stage scrubber 26 fall into a sump 70 located at the bottom of first and second stage scrubbers 25 and 26 bound by each respective housing 40 and 60 thereof. Sump 70 contains a predetermined amount or level of water, for instance 1000–3000 gallons, supplied from a water source (not shown). The water carried by sump is normally constantly circulated through conduit assemblies 45 and 64 of first and second stage scrubbers 25 and 26, respectively, by virtue of conventional pumps 71 and 72 coupled with housings 60 and 40 of wet stage scrubber assembly 24, respectively (shown only in FIG. 6). Furthermore, the water in sump 70 is either continuously or periodically replenished from a make-up water source (not shown) operative for maintaining the water level at a predetermined and desired level. In this manner, precipitated and dissolved toxic and odoriferous pollutants falling within sump 70 may be desirably contained within the water carried in sump 70 in accordance with conventional practice.

With attention directed back to FIG. 2, from second stage scrubber 26, the contaminated gas will pass through a passageway or opening 78 and enter third stage scrubber 27. Although not an essentially limiting feature, opening 78 may be obstructed by a low density screen or filter and is preferably located somewhat subjacent opening 56 to facilitate the efficient flow of the contaminated gas from second stage scrubber 25 to third stage scrubber 27. Third stage scrubber 27 is generally comprised of a housing 80 that, as best seen in FIG. 1, is generally cubical in shape, although this is not essential. Upon entrance into third stage scrubber 27, the contaminated gas will impact an angled platform 81 changing the flow of the contaminated gas from a substantially horizontal path as indicated by the arrowed line A to a substantially vertical path as indicated by the arrowed line B. After impacting platform 81, the contaminated gas will flow into and through a mist eliminator 84 and into and through a filtering assembly 85 where a third measure of the pollutants is removed. As previously discussed, the third measure of pollutants may be either one or more types of pollutants or perhaps an amount or quantity of the total measure of pollutants carried by the contaminated gas. In any event, upon removal of the third measure of pollutants, further details to be discussed presently, the gas will be substantially free from pollutants and will safely emit through outlet 23.

With attention directed to FIG. 5 illustrating a fragmented partially exploded perspective view of third stage scrubber 27, housing bounds or otherwise defines a chamber 82 within which are carried in series a plurality of filtering layers 83 that comprise filtering assembly 85. Consistent with a preferred embodiment, filtering layers 83 (also seen in FIGS. 1 and 2) are carried in substantially vertical series commensurate with the directional flow of the contaminated gas. Furthermore, although three layers 83 are evidenced in the present example, less or more may be employed without departing from the nature and scope of the present invention as herein specifically described.

Each filtering layer 83 is generally comprised of a plurality of trays 90 mounted and removably carried by housing 80 in a substantially horizontal or otherwise perpendicular orientation relative the directional flow of the contaminated gas. Each filtering layer 83 includes a total of nine individual trays 90, although less or more may be used consistent with the teachings contained herein. Each tray 90 carries filtering media 91. Filtering media 91 is preferably dry and may be comprised of a carbon-based media or other suitable dry filtering media. Although not herein specifically shown, trays 90 may be mounted on rails, platforms or other suitable mechanism that may be supplied with housing 80 in order to facilitate the installation and removal of trays 90 into and from chamber 82 of housing 80.

The purpose of constructing each filtering layer 83 with a plurality of trays 90 operative for carrying filtering media 91 is so that each tray 90 may be easily installed and removed manually without the need of employing additional equipment such as vacuum removal equipment and the like. Trays 90 may be removed and installed much like the drawers of a conventional chest of drawers. In this regard, each tray 90 may be easily transported when full of filtering media 91 by an ordinary man or woman without considerable difficulty. Therefore, in operation, the filtering media 91 carried by each of the trays 90 of each filtering layer 83 will collect or otherwise filter the third measure of pollutants from the contaminated gas as it flows through the filtering layers 83.

Over time, the filtering media will become spent and have to be replaced. In this regard, rather than shutting down the entire scrubber system, the trays 90 of each filtering layer 83 may be individually and easily removed. Once removed, a user may discard the spent filtering media 91 to be replaced with fresh filtering media 91. Upon installation of fresh filtering media 91, the trays 90 of one of the selected filtering layers 83 may be reinstalled and the process repeated with the other filtering layers 83 if desired. In this regard, each filtering layer 83 may be easily and independently maintained with fresh filtering media 91 without having to shut down the entire scrubber assembly 20. Additionally, individual trays 90 from each filtering layer 83 may also be selectively and independently removed, maintained and re-installed as desired to ensure proper operation.

To facilitate proper gas flow through third stage scrubber 27, each tray 90 is preferably constructed of a low density material. Furthermore, and as evidenced in FIG. 5, each tray may be provided with a removable lid 92 for allowing a user to easily access each tray for removing and replacing filtering media 91 as required for proper maintenance of scrubber assembly 20. Mist eliminator 84, although not an essential feature of the present invention, is a conventional apparatus operative for removing moisture from the contaminated gas prior to its flow into and through filtering assembly 85. The moisture collected by mist eliminator 84 will fall and collect upon platform 81 which will funnel the moisture downwardly into a drain 86 (FIG. 2).

As previously indicated, for gas to pass from inlet 22 to outlet 23 of scrubber assembly 20, the gas must be flowing. In this regard, the flowing movement of the gas may be accomplished, as previously intimated, from a location remote from scrubber system 20 or may be accomplished by a motorized or otherwise mechanical mechanism carried by scrubber system 20. Regarding the latter, and as shown in FIG. 2, FIG. 5, FIG. 6 and FIG. 7 illustrating an end elevational view of scrubber system 20 of FIG. 1, outlet 23 may be provided with a conventional blower or fan 93 operative for drawing gas inwardly from inlet 22 and outwardly from outlet 23. The placement of fan 93 at outlet 23 is not an essential feature. In this regard, fan 93 may be located at other suitable locations with scrubber assembly 20 without departing from the nature and scope of the present invention as herein specifically described.

As previously mentioned, first, second and third stage scrubbers 25, 26 and 27, respectively, each operate to remove first, second and third measures of pollutants, respectively, from the contaminated gas entering inlet 22 so that the gas emitted from outlet 23 is substantially free from pollutants. To enhance the efficiency of scrubber system 20, the present invention includes the provision and method for controlling the amount of liquid chemical reagents added to the first and second stage scrubbers 25 and 26 in order to effectuate the efficient removal of the maximum respective measures of pollutants from the contaminated gas when passing through the first and second stage scrubbers 25 and 26. To carry out this task, a control assembly 120 may be provided.

Figure 8:
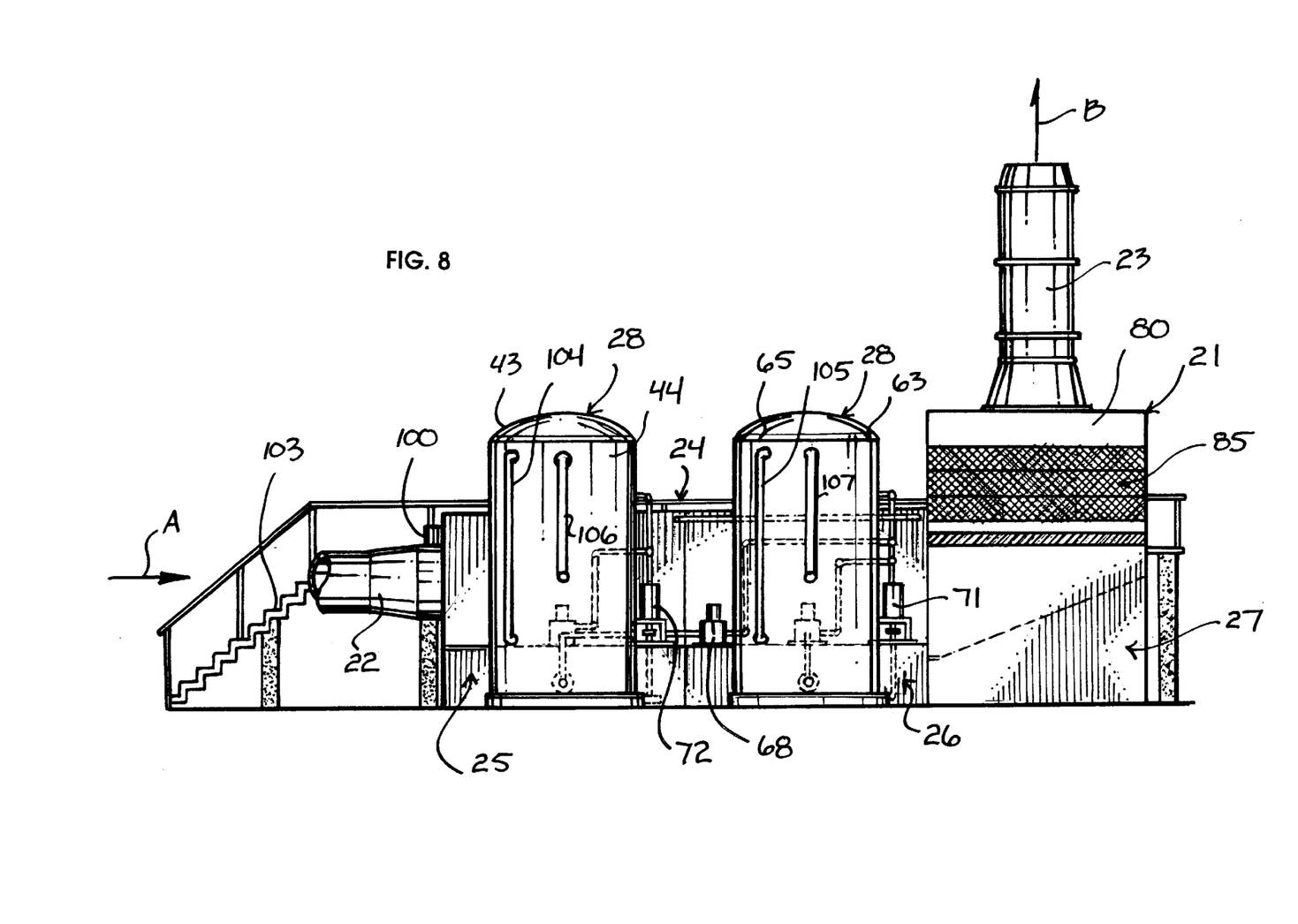
FIG. 8 illustrates a rear elevational view of the scrubber system of FIG. 1, in accordance with a preferred embodiment of the present invention.
Figure 9:
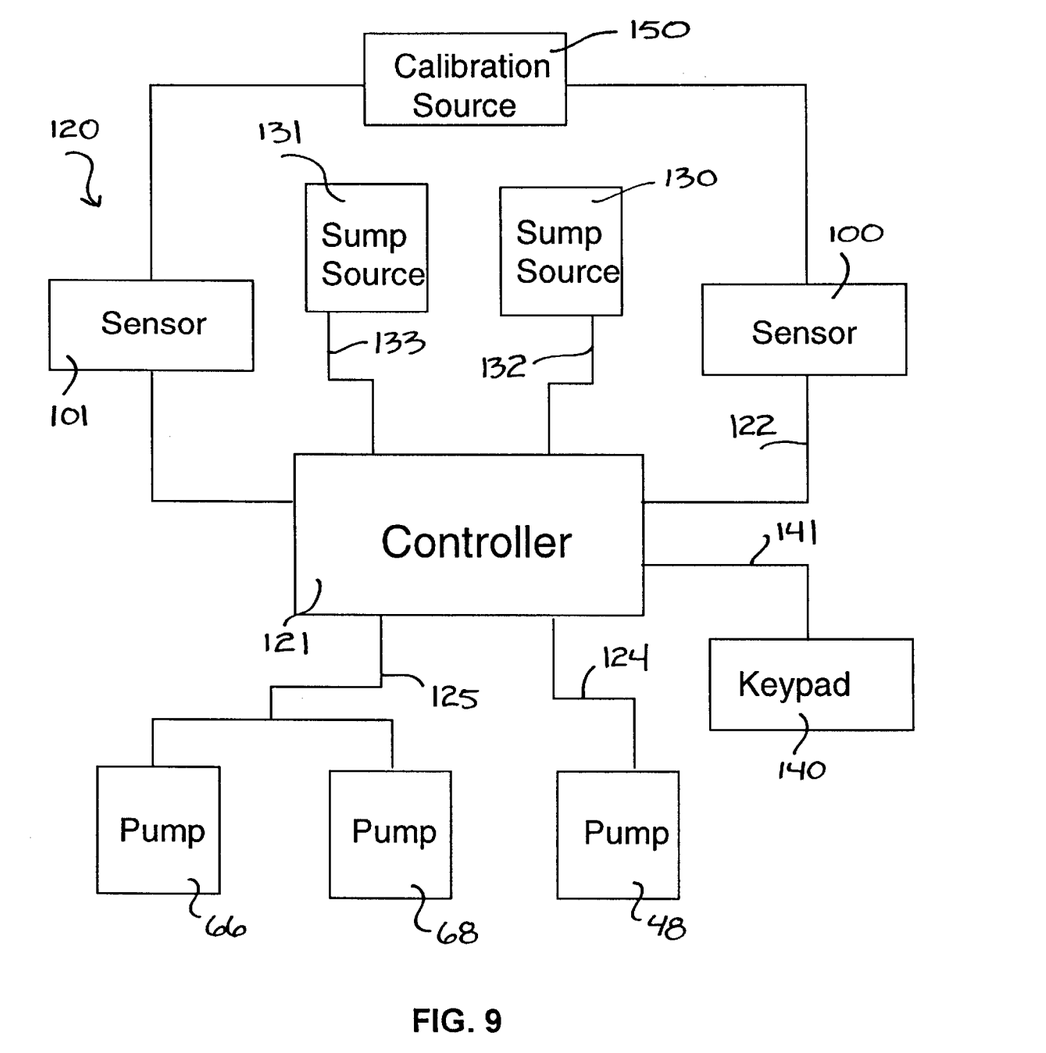
FIG. 9 illustrates a block diagram of a control assembly for controlling the operation of the scrubber system of FIG. 1.

Control assembly 120, a block diagram of which may be seen in combination with FIG. 9, is generally comprised of a first sensor 100 (shown also in FIGS. 1, 2, 3, 6 and 8) which may be coupled with inlet 22 adjacent first stage scrubber 25 and a second sensor 101 (shown also in FIG. 2) coupled with opening 78 intermediate second stage scrubber 26 and third stage scrubber 27. Sensor 100 of control assembly 120 operates to directly monitor and sample the gas passing through inlet 22 prior to entering first stage scrubber 25 to determine the level, measure and/or amount of pollutants present in the contaminated gas at inlet 22. Similarly, sensors 101 of control assembly 120 operates to directly monitor and sample the gas passing through opening 78 prior to entering third stage scrubber 27 to determine the level, measure and/or amount of pollutants present in the contaminated gas at each respective location. For the purposes of the ensuing discussion, the level, measure and/or amount of pollutants present within the contaminated gas passing through scrubber system may be hereinafter collectively referred to as the concentration of pollutants for ease of discussion.

Consistent with the foregoing, sensor 100 and sensor 101 of control assembly 120 may also be coupled with a controller 121 mounted with structure 21 by virtue of conventional electrical interconnections 122 and 123, respectively. Although controller 121 may be located anywhere along structure 21 and perhaps at a location remote from structure 21, the present embodiment illustrates controller 120 located at third stage scrubber 27 as illustrated in combination with FIG. 2, although this is not an essential feature. Although not herein specifically described, controller 121 includes conventional electrical circuitry and a conventional microprocessing unit and logic circuitry operative for receiving signals from sensors 100 and 101 and for responding to the signals in a manner to be presently described, controller 121 being programmable by virtue of conventional programming operations for allowing a user to control the operation of scrubber system 20 in a predetermined and selected fashion.

As evidenced in FIG. 9, controller 121 may be coupled with pump 48 by virtue of conventional electrical interconnection 124 and to pumps 66 and 68 by virtue of conventional electrical interconnection 125. In this regard, and as previously intimated, sensor 100 will operate to monitor the concentration of pollutants in the contaminated gas at inlet 22 prior to entry into first stage scrubber 25 and communicate this information in the form of a signal to controller via electrical interconnection 122 to controller 121. If the concentration of pollutants monitored by sensor 100 are high, controller 121 will send a signal to pump 48 via electrical interconnection 124 to actuate and control pump 48 to correspondingly increase the amount of chemical reagent added to chamber 41 of first stage scrubber 25 to thereby increase the cleaning intensity of first stage scrubber 25 in response to the concentration of pollutants entering first stage scrubber 25 from inlet 22. Furthermore, if the concentration of pollutants monitored by sensor 100 are low, controller 121 will send a signal to pump 48 via electrical interconnection 124 to actuate and control pump 48 to correspondingly decrease the amount of chemical reagent added to chamber 41 of first stage scrubber 25 to thereby decrease the cleaning intensity of first stage scrubber 25 in response to the concentration of pollutants entering first stage scrubber 25 from inlet 22.

Those having regard toward the relevant art will appreciate that control assembly 120 operates to conserve the liquid chemical reagent supplied from receptacle 44 by selectively actuating pump 48 to add only so much liquid chemical reagent as is necessary to effectively remove the first measure of toxic and/or odoriferous contaminates consistent with normal operation of first stage scrubber 25. In addition, with sensor 100 located at inlet 22 adjacent first stage scrubber 25, variations in the measure of pollutants will be immediately detected for effecting the desired and virtually instantaneous actuation of pump 48 to either increase or decrease the amount of liquid chemical reagent supplied to housing 40 in order to accommodate the increased or decreased measure of pollutants in the contaminated gas. Consistent with the present teachings, sensor 100 may be provided as an electrical and conventional hydrogen sulfide sensor/analyzer or other suitable and conventional sensor/analyzer operative for detecting pollutants.

Like sensor 100, sensor 101 will operate to monitor the concentrations of pollutants in the contaminated gas at opening 78 intermediate second stage scrubber 26 and third stage scrubber 27 prior to entry into third stage scrubber 27 and communicate this information in the form of a signal to controller 121 via electrical interconnection 123. If the concentration of pollutants monitored by sensor 100 are high, controller 121 will send a signal to pump 66 and/or pump 68 to actuate and control pump 66 and/or pump 68 to correspondingly increase the amount of chemical reagent added to chamber 61 of second stage scrubber 26 to thereby increase the cleaning intensity of second stage scrubber 26 in response to the concentration of pollutants present in the fluid passing through opening 78. Furthermore, if the concentration of pollutants monitored by sensor 100 are low, controller 121 will send a signal to pump 66 and/or pump 68 to actuate and control pump 66 and/or pump 68 to correspondingly decrease the amount of chemical reagent added to chamber 61 of second stage scrubber 26 to thereby decrease the cleaning intensity of second stage scrubber 26 in response to the concentration of pollutants present in the fluid passing through opening 78.

Those having regard toward the relevant art will readily appreciate that control assembly 120 operates to conserve the liquid chemical reagent supplied from receptacle 44 and/or receptacle 65 by selectively actuate pump 66 and/or pump 68 to add only so much liquid chemical reagent as is necessary to effectively remove the second measure of toxic and/or odoriferous contaminates consistent with normal operation of second stage scrubber 26. In addition, with sensor 101 located at opening 78 intermediate second stage scrubber 26 and third stage scrubber 27, variations in the measure of pollutants passing through opening 78 will be immediately detected for effecting the desired and virtually instantaneous actuation of pumps 66 and 68 to either increase or decrease the amount of liquid chemical reagent supplied to housing 60 in order to accommodate the increased or decreased concentration of pollutants in the contaminated gas passing through opening 78. Consistent with the present teachings, sensor 101 may be provided as an electrical and conventional hydrogen sulfide sensor/analyzer or other suitable and conventional sensor/analyzer operative for detecting pollutants.

With continuing reference to FIG. 9, the present invention may also be provided with a first sump sensor 130 operative for monitoring the concentration of chemical reagent in the water carried by sump 70 in chamber 41 of first stage scrubber 25, and a second sump sensor 131 operative for monitoring the concentration of chemical reagents carried by sump 70 in chamber 61 of second stage scrubber 26. Consistent with conventional practice, sump sensor 130 may be provided as a conventional pH sensor operative for monitoring the relative pH of the water carried by sump 70 in chamber 41, the relative pH corresponding to the concentration of sodium hydroxide present within the water. Sump sensor 131, on the other hand, may be provided as a combination pH/oxidation-reduction-potential sensor operative for monitoring not only the pH but also the available oxygen in the water carried by sump 70 in chamber 61, the amount of available oxygen corresponding to the level of sodium hypochlorite present within the water.

In this regard, sump sensor 130 will operate to monitor the concentration of chemical reagent in the water carried by sump 70 in chamber 41 of first stage scrubber 25 and communicate this information in the form of a signal to controller 121 via electrical interconnection 132. In response to the concentration of chemical reagent monitored by sump sensor 130, controller 121 may use not only the information provided from sensor 100 but also the information provided from sump sensor 130 to correspondingly send selected signals to pump 48 to either increase the amount of chemical reagent to chamber 41 if the concentrations of pollutants at inlet 22 are high and the concentrations of chemical reagent in the water located in sump 70 within chamber 41 are low, or decrease the amount of chemical reagent to chamber 41 if the concentrations of pollutants at inlet 22 are low the concentrations of chemical reagent in the water located in sump 70 within chamber 41 are correspondingly high.

Similarly, sump sensor 131 will operate to monitor the concentration of chemical reagent in the water carried by sump 70 in chamber 61 of second stage scrubber 26 and communicate this information in the form of a signal to controller 121 via electrical interconnection 133. In response to the concentration of chemical reagent monitored by sump sensor 131, controller 121 may use not only the information provided from sensor 101 but also the information provided from sump sensor 131 to correspondingly send selected signals to pump 66 and/or pump 68 to either increase the amount of chemical reagent to chamber 61 if the concentrations of pollutants at opening 78 are high the concentrations of chemical reagent in the water located in sump 70 within chamber 61 are low, or decrease the amount of chemical reagent to chamber 61 if the concentrations of pollutants at opening 78 are low the concentrations of chemical reagent in the water located in sump 70 within chamber 61 are correspondingly high.

Those skilled in the art will readily appreciate that controller assembly 120 provides a redundant system of directly monitoring the concentrations of pollutants at inlet 22 and at opening 28, and the concentrations of chemical reagents in sump 70 for facilitating immediate and efficient responses in the amount of chemical reagents added to first stage scrubber 25 and second stage scrubber 26 and to allow a user to ascertain the operating efficiency of wet stage scrubber assembly 24. Control assembly 120 further operates to optimize the operation of first and second stage scrubbers 25 and 26, respectively. As a result, the life or longevity of the filtering media 91 carried by the filtering layers 83 in the third stage scrubber 27 may be maximized to inhibit premature build up or saturation of the filtering media 91 with pollutants.

To provide flexibility in the operation of scrubber system 20, the microprocessing unit of the controller 121 may be programmed for actuating pump 48 and pumps 66 and/or 68 in response to predetermined and selected threshold concentrations of pollutants present in the contaminated gas as monitored by sensors 100 and 101, and in response to predetermined and selected threshold concentrations of chemical reagents present within sump 70 both in first stage scrubber 25 and second stage scrubber 26. For instance, if a user requires scrubber system 20 to respond to small fluctuations in the concentration of pollutants entering inlet 22 and passing through opening 78, and/or to small fluctuations in the concentration of chemical reagents with the sump 70 located in first and second stage scrubbers 25 and 26, a user may program controller 121 to respond accordingly. On the other hand, if a user requires scrubber system 20 to respond only to large fluctuations in the concentration of pollutants entering inlet 22 and passing through opening 78, and/or to respond only to large fluctuations in the concentrations of chemical reagents with the sump 70 located in first and second stage scrubbers 25 and 26, a user may program controller 121 to respond accordingly. The ability of a user to program controller 121 in the foregoing manner will save on the cost of chemical reagents, provide flexibility and minimize waste. To carry out this programming, a conventional keypad 140 may be provided and coupled with controller by virtue of conventional electrical interconnection 141, keypad 140 operative for manual manipulation to allow a user to program desired information into controller 121 to facilitate desired operating parameters of scrubber system 20. Keypad 140 may be mounted either with structure 21 adjacent controller 121, or perhaps at a remote location.

Over a period of operating time of scrubber system 20, sensors 100 and 101 will be constantly subjected to high levels pollutants. As a result, sensors 100 and 101 may experience reduced response ability and perhaps total sensor failure over a certain period of operating time. This is particularly true with conventional hydrogen sulfide sensors. Accordingly, the present invention provides a method of periodically cleaning sensors 100 and 101 to substantially eliminate reduced sensor response and sensor failure. The foregoing method may be carried out through the selective programming of controller 121. In this regard, controller 121 may be programmed such that during operation of scrubber assembly 20, controller 121 will send a signal to each sensor 100 and 101 via electrical interconnection 122 and 123, respectively, to actuate a first switch or solenoid carried by each sensor 100 and 101 to toggle each sensor 100 and 101 from monitoring the contaminated gas to monitoring a zero- or fresh-fluid source such as the ambient air. The controller 121 will maintain each sensor 100 and 101 to monitor the fresh-fluid source for a predetermined amount of time, such as ten minutes in a preferred embodiment or other selected and predetermined amount of time, during which sensors 100 and 101 will essentially undergo a cleaning process purging out built up contaminants. After the foregoing predetermined amount of time has passed, controller 121 will send a signal to each sensor 100 and 101 via electrical interconnection 122 and 123, respectively, to actuate the first switch or solenoid carried by each sensor 100 and 101 to toggle each sensor 100 and 101 from monitoring the fresh-fluid source to the contaminated gas in accordance with normal operation of scrubber system 20. The foregoing process may be carried out every hour, daily, or at other predetermined intervals during the operation of scrubber system 20 as determined by the user and programmed into controller 121.

In addition to the foregoing, it may also be desirable to monitor sensors 100 and 101 periodically to ascertain whether they are operating within predetermined and selected parameters in accordance with the normal operation of scrubber system 20. Accordingly, the present invention provides a method of periodically monitoring sensors 100 and 101 that may be carried out through the selective programming of controller 121. In this regard, controller 121 may be programmed such that during operation of scrubber assembly 20, controller 121 will periodically send a signal to each sensor 100 and 101 via electrical interconnection 122 and 123, respectively, and actuate a second switch or solenoid carried by each sensor 100 and 101 to toggle each sensor 100 and 101 from monitoring the contaminated gas to monitoring a calibration source 150 to which each sensor may be coupled. Although calibration source 150 is shown as being common to both sensors 100 and 101, this is not an essential feature and each sensor 100 and 101 may each be coupled with an individual calibration source consistent with the present teachings. Calibration source 150 may be comprised of a selected and predetermined fluid, such as a 10 PPM (parts/million) hydrogen sulfide gas or other selected gas having a predetermined PPM level of calibration material such as hydrogen sulfide. Sensors 100 and 101 will each monitor the calibration source to determine the relative PPM of the calibration material and will conduct this information in the form of signal via electrical interconnections 122 and 123 to controller 121.

The controller 121 will then compare the monitored PPM values sensed by each sensor 100 and 101 and compare the monitored PPM values with a predetermined and selected range of values that may be programmed into controller 121 by a user. If the monitored PPM values fall within the predetermined and selected range of values programmed into controller 121 by the user, controller will subsequently send a signal back to each sensor 100 and 101 via electrical interconnections 122 and 123, respectively, actuating the second switch or solenoid of each sensor 100 and 101 to toggle each sensor 100 and 101 from calibration source 150 and back to the contaminated gas at inlet 22 and opening 78, respectively, to resume normal operation of scrubber system 20. If, on the other hand, the monitored PPM values fall outside the predetermined and selected range of values programmed into controller 121 by the user, controller will subsequently send a signal back to each sensor 100 and 101 via electrical interconnections 122 and 123, respectively, actuating the second switch or solenoid of each sensor 100 and 101 to toggle each sensor 100 and 101 from calibration source 150 and back to the contaminated gas at inlet 22 and opening 78, respectively, to resume normal operation of scrubber system 20. However, controller 121 will also actuate an indicator (such as a light or an audible alarm carried by controller 121) for alerting the user that the sensor 100. and/or sensor 101 requires recalibration and/or maintenance. The foregoing process may be carried out daily, weekly, monthly or at other predetermined intervals during the operation of scrubber system 20 as determined by the user and programmed into controller 121.

The present invention has been described above with reference to a preferred embodiment. However, those skilled in the art will recognize that changes and modifications may be made in the described embodiments without departing from the nature and scope of the present invention. For instance, scrubber system 20 may be provided with a walkway 103 (shown in FIGS. 1, 2, 6, 7 and 8) coupled with structure 21 upon which workers may walk and access scrubber system 20 as needed for maintenance and repair. Furthermore, and as shown in FIG. 8 illustrating a rear elevational view of scrubber system 20, receptacles 44 and 65 of liquid delivery system 28 may each be provided with a transparent fluid level indicator 104 and 105, respectively, for allowing users to easily ascertain the level of liquid chemical reagent within each receptacle 44 and 65. Each receptacle 44 and 65 may also be provided with a conventional fill and drain port 106 and 107, respectively, for allowing users to easily fill and drain each receptacle 44 and 65 as needed for the normal operation of scrubber system 20. Furthermore, housing 80 may be provided with a door 151 as shown in FIG. 1 and accessible for accessing a storage compartment (not shown) bound by housing 80 of third stage scrubber 27 in which selected tools and other selected items may be desirably stored.

In addition to the foregoing, housings 40 and 60 of first and second stage scrubbers 25 and 26 may be provided with removable access panels that may preferably extend along substantially the entire width of each housing 40 and 60, respectively, and operative for allowing the easy installation and removal of media as required for normal and efficient operation of scrubber assembly 20. Consistent with the foregoing, and as shown in FIG. 1, housings 40 and 60 may each be provided with removable first or top panels 110 located on top of each housing 40 and 60 and removable second or bottom panels 111 located toward the bottom of each housing 40 and 60. Top and bottom panels 110 and 111 may be detachably mounted with each housing 40 and 60 by virtue of convention nut and bolt fasteners or other suitable fasteners operative for facilitating easy installation and removal. In this manner of orientation of panels 110 and 111, top panels 110 may be removed and media easily introduced through openings occluded by the top panels 110 and then reinstalled when full. Furthermore, bottom panels 111 may be removed and media easily removed through openings occluded by the bottom panels 111. With the bottom panels 111 located proximate the bottom of each housing 40 and 60, gravity will cause the media contained by each housing 40 and 60 to fall outwardly from the openings occluded by the bottom panels 111 without the need of enlisting additional mechanical equipment to facilitate removal. When each housing 40 is empty, bottom panels 111 may be reinstalled prior to filling housings 40 and 60 with fresh media. Because each housing 40 and 60 includes top and bottom panels 110 and 111, the media of each individual housing 40 and 60 may be independently maintained in the foregoing manner.

Figure 10:
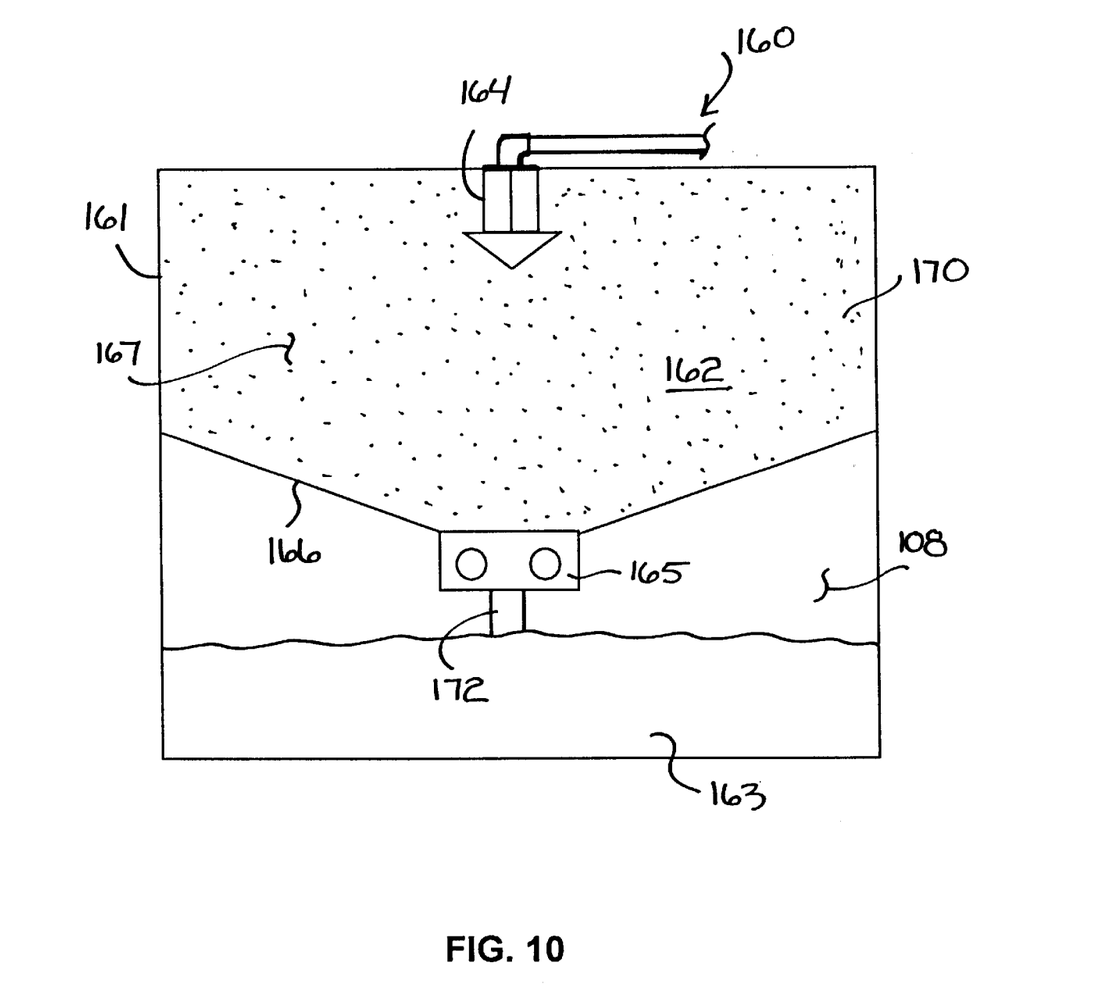
FIG. 10 illustrates a vertical sectional view of a wet stage scrubber assembly being generally representative of the wet stage scrubber assembly introduced in combination with FIG. 1.

Those having regard toward the art will readily appreciate that because the volume of water located within sump 70 may be on the order of perhaps 1000–3000 gallons, variations in pH and oxygen in the water corresponding to the concentrations of chemical reagents present within sump 70 at first stage scrubber 25 and second stage scrubber 26 occur very slowly. To enhance the ability to more accurately assess the concentrations of chemical reagents present within sump 70 at first and second stage scrubbers 25 and 26, attention is directed to FIG. 10 illustrating a vertical sectional view of a wet stage scrubber generally designated at 160 and of which is intended to be generally representative of first stage scrubber 25 and second stage scrubber 26. Like first and second wet stage scrubbers 25 and 26, wet stage scrubber 160 includes a housing 161 bounding a chamber 162 and a sump 163. Also included is at least one nozzle 164 mounted with housing 161 for communicating chemical reagent into chamber 162 in the manner and form previously described in combination with first and second wet stage scrubbers 25 and 26. As illustrated, located within chamber 162 is an intermediate sump 165 located spaced from or otherwise elevated from sump 163. Also included is a partition or intermediate floor 166 dividing chamber 162 into a first chamber portion 167 of which may be filled with media 170 (much like media 42 and media 62 previously discussed) and a second chamber portion 168 encompassing sump 163. Intermediate sump 165 encompassing a volume of perhaps 100–200 gallons or other predetermined volume substantially less than the total volume of sump 163.

During operation, the water and chemical reagents dispersed into and through first chamber portion 167 from nozzle 164 will fall through media 170 and conduct into intermediate sump 165 by virtue of partition 166 and then outwardly through a drain 172 formed with intermediate sump 165 for receipt by sump 163. Because intermediate sump 165 encompasses a volume substantially less than the volume of sump 163, variations in the concentrations of chemical reagents corresponding to variations in pH and/or available oxygen concentrations will occur rapidly and be relatively dramatic as compared to the variations in concentrations of chemical reagents within sump 163. Accordingly, it may be desirable to locate sump sensors within intermediate sump 165 to more accurately, quickly and efficiently discern variations in concentrations of chemical reagents present within sump 163. Thus, first and second wet stage scrubbers 25 and 26 may each be fitted with partition 166 and intermediate sump 165 in accordance with the foregoing discussion. Sump sensor 130 may then be correspondingly located within the intermediate sump of first wet stage scrubber 25 and sump sensor 131 located within the intermediate sump of second wet stage scrubber 26. In this manner of placement, sump sensors 130 and 131, in combination with each respective intermediate sump, will operate to immediately detect variations in pH and/or available oxygen concentrations, rather than if located within sump 70, and communicate the information to controller 121 of control assembly 120 as previously discussed in accordance with normal operation. Because intermediate sump 165 allows sump sensors 130 and 131 to measure acute variations in the concentrations of chemical reagents, a user may use sump sensors 130 and 131 in control assembly 120 in the foregoing manner independently of sensors 100 and 101 if desired.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A scrubber for removing pollutants from a gas and having an inlet for receiving the gas and an outlet for emitting the gas, the scrubber comprising:
    a housing coupled with the gas intermediate the inlet and the outlet;
    a source of pollutant-reactive filtering agent;
    a pump coupled to the source of filtering agent and to the housing in fluid communication;
    at least one dispersing element for communicating the filtering agent from the pump into the housing;
    a sump for collecting the filtering agent, the sump having a first volume;
    an intermediate sump for collecting the filtering agent and channeling the filtering agent into the sump, the intermediate sump having a second volume that is less than the first volume; and
    means for monitoring the concentration of filtering agent at the intermediate sump and for actuating the pump for altering the amount of filtering agent supplied to the housing in response thereto.

2. The scrubber of claim 1, wherein the at least one dispersing element includes a substantially conical face for receiving the filtering agent and dispersing the filtering agent into the housing.

3. The scrubber of claim 1, further including means for monitoring the pollutants present within the gas adjacent the inlet and for actuating the pump for altering the amount of filtering agent supplied to the housing in response thereto.

4. A method of removing pollutants from a gas comprising steps of:
    providing a housing having an inlet for receiving gas and an outlet for emitting gas;
    introducing an amount of pollutant-reactive filtering agent into the housing;
    collecting the filtering agent with a sump having a first volume;
    collecting filtering agent with an intermediate sump having a second volume that is less than the first volume;
    monitoring the concentration of filtering agent at the intermediate sump; and
    when the concentration of the filtering agent at the intermediate sump falls outside a predetermined threshold, altering the amount of filtering agent being introduced into the housing.

5. The method of claim 4, wherein the step of introducing further includes steps of:
    coupling a pump to the source and the housing in fluid communication; and
    actuating the pump.

6. The method of claim 5, wherein the step of providing at least one dispersing element further includes the step of providing an inverted substantially conical member for receiving the filtering agent and dispersing the filtering agent into the housing.

7. The method of claim 4, further including steps of monitoring the pollutants present within the gas adjacent the inlet and altering the amount of filtering agent being introduced into the housing in response thereto.

8. The method of claim 5, wherein the step of altering the amount of filtering agent being introduced into the housing further includes the step of actuating the pump.

9. A scrubber for removing pollutants from a gas and having an inlet for receiving the gas and an outlet for emitting the gas, the scrubber comprising:
    a housing coupled with the gas intermediate the inlet and the outlet;
    a source of a pollutant-reactive filtering agent;
    means for introducing the filtering agent into the housing;
    a sump for collecting the filtering agent, the sump having a first volume;
    an intermediate sump for collecting the filtering agent and channeling the filtering agent into the sump, the intermediate sump having a second volume that is less than the first volume; and
    means for monitoring the concentration of filtering agent at the intermediate sump and for actuating the pump for altering the amount of filtering agent supplied to the housing in response thereto.

10. The scrubber of claim 11, the means comprising:
    a pump coupled to the source of filtering agent and to the housing in fluid communication; and
    at least one dispersing element for communicating the filtering agent from the pump into the housing.

11. The scrubber of claim 10, wherein the at least one dispersing element includes a substantially conical face for receiving the filtering agent and dispersing the filtering agent into the housing.

12. The scrubber of claim 10, further including means for monitoring the pollutants present within the gas adjacent the inlet and for actuating the pump for altering the amount of filtering agent supplied to the housing in response thereto.

* * * * *